United States Patent
Asada et al.

[11] Patent Number: 5,326,384
[45] Date of Patent: Jul. 5, 1994

[54] SLIDING MATERIAL

[75] Inventors: Eiji Asada; Takashi Tomikawa; Kenichiro Futamura, all of Aichi, Japan

[73] Assignee: Taiho Kogyo Co., Ltd., Toyota, Japan

[21] Appl. No.: 737,865

[22] Filed: Jul. 30, 1991

[30] Foreign Application Priority Data

Jul. 31, 1990 [JP] Japan .................. 2-201248
Aug. 14, 1990 [JP] Japan .................. 2-213734
Aug. 31, 1990 [JP] Japan .................. 2-230068

[51] Int. Cl.$^5$ .............................. C22C 29/00
[52] U.S. Cl. ............................ 75/231; 75/243; 75/247
[58] Field of Search .................. 75/231, 243, 244, 247

[56] References Cited

U.S. PATENT DOCUMENTS

| | | | |
|---|---|---|---|
| 3,776,705 | 12/1973 | Niimi et al. | 75/247 |
| 3,833,344 | 9/1974 | Gerloff et al. | 75/243 |
| 3,869,259 | 3/1975 | Lindsey | 75/243 |
| 4,000,981 | 1/1977 | Sugafuji et al. | 75/230 |
| 4,334,926 | 6/1982 | Futamura et al. | 75/230 |
| 4,505,987 | 3/1985 | Yamada et al. | 428/553 |
| 4,702,771 | 10/1987 | Takagi et al. | 75/241 |
| 4,732,625 | 3/1988 | Livak | 148/433 |
| 4,935,056 | 6/1990 | Miyasaka | 75/231 |
| 4,941,919 | 7/1990 | Asada et al. | 75/235 |

Primary Examiner—Donald P. Walsh
Assistant Examiner—Ngoclan T. Mai
Attorney, Agent, or Firm—Armstrong, Westerman, Hattori, McLeland & Naughton

[57] ABSTRACT

The Cu-based sintered sliding materials contain: 1–10% of graphite, $MoS_2$ and/or $WS_2$; 1–30% of hard matter selected from (a) and (b); and, 0.1–15% of Sn. The sliding materials have improved seizure resistance, wear resistance and corrosion resistance.

The hard matter:
(a) $Fe_2P$, $Fe_3P$, $FeB$, $Fe_2B$, Mo, Co-based self fluxing alloy and Ni-based self fluxing alloy and
(b) Fe-Cr, Fe-Mn, Fe-Ni, Fe-Si, Fe-W, Fe-Mo, Fe-V, Fe-Ti, Fe-Nb, CuP, Cr, and W.

3 Claims, 1 Drawing Sheet

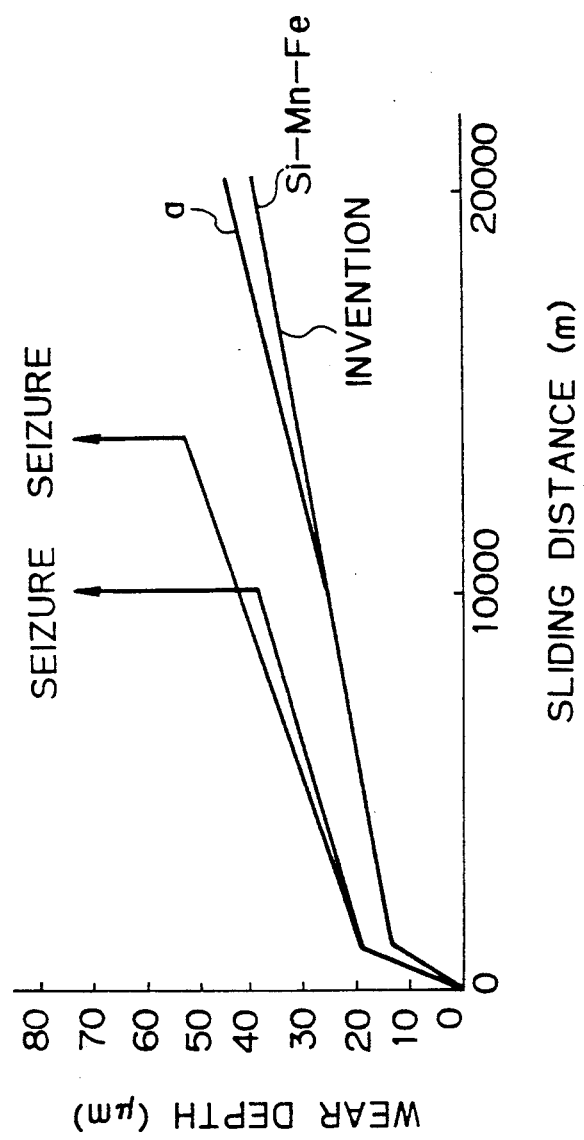

SLIDING MATERIAL

BACKGROUND OF INVENTION

1. Field of Invention

The present invention relates to a Cu based, sintered, sliding material. More particularly, the sliding material according to the present invention is used in a sliding bearing where corrosion-resistance against the lubricating oil or wear-resistance is required. When the opposed shaft of the sliding bearing has a rough surface and/or is made of a material such as cast iron, a part of the sliding material of a bearing, particularly graphite, is easily removed during sliding, thus forming a rough surface. The sliding material is worn out by the rough surface, which may be formed either by machining or partial removal of the material during sliding.

2. Description of Related Arts

Bronze and lead bronze, which are used in a large amount for bushes exhibit excellent wear- and load-resistance. However, along with recent change in the conditions under which sliding bearings are particularly used, such as increase in the surface pressure and rise in the temperature of lubricating oil, bearing troubles due to wear occur frequently. Hard matters are therefore added to the lead-bronze which is sintered onto a steel sheet, so as to enhance the wear-resistance such that it can meet the recent changes in conditions under which the sliding material is used.

The sliding material proposed in Japanese Examined Patent Publication No. 57-50844 filed by the present assignee is characterized in that its composition is from 10 to 40% of Pb, from 1 to 30% of hard matter, the balance being Cu; or from 10 to 40% of Pb, from 1 to 30% of hard matter, from 0.2 to 10% of Sn and/or from 0.1 to 5% of Sb, the balance being Cu. The hard matter used is Mo, Co, $Fe_3P$, FeB, $Fe_2B$, or an Ni or Co-based self-fluxing alloy having a particular composition.

It is heretofore known to add graphite, or graphite and Sn, to the Cu-based sintered alloy for use as the sliding material under non-lubricating or boundary lubricating conditions. Such a sintered alloy is disclosed in Japanese Examined Patent Publication No. 36-67, Japanese Examined Patent Publication No. 39-27985, Japanese Examined Patent Publication No. 36-13058, and Japanese Examined Publication No. 46-43681. In Japanese Examined Patent Publication No. 46-43681, the additives to the Cu-Sn based alloy or Cu-Sn-Pb based alloy are: materials having high-melting points such as metals, e.g., Zr, Cr, V, Mo, Ta and W, oxides, e.g., $Al_2O_3$, $ZrO_2$, $TiO_2$, and $ThO_2$, carbides, e.g., SiC and WC, nitrides, e.g., AlN, TaN, and TiN, borides, e.g., MoB, and WB, and silicides, e.g., $CrSi_2$, graphite, and boron. It is proposed in this publication to use Cu alloys with these additives in various applications such as wear-resistant materials, brake materials, and the like.

The oxide, nitride and carbide proposed in Japanese Examined Patent Publication No. 46-43681 mentioned above as the hard materials, enhance the properties required for brake materials but do not achieve satisfactorily high seizure resistance under the boundary lubricating condition. Such metals as Zr, Cr, V, Mo, Ta, and W exhibit better seizure resistance than the oxide, nitride and carbide do. However, since each of these metals have difficulty forming an alloy with Cu, and even if they are somehow alloyed with Cu, their compatibility with the Cu matrix is so poor that they are easily removed from the matrix. Abrasive wear due to removed metal particles therefore occurs, which then leads the seizure.

The graphite proposed in Japanese Examined Patent Publication No. 46-43681 is held in the Cu or Cu-Sn matrix. Since the Cu-Sn matrix is strengthened by Sn, the graphite is held by the matrix more strongly than in the case where it is held in the Cu matrix. Nevertheless, the graphite may be removed from the Cu-Sn matrix during the working of the Cu-Sn alloy with the graphite additive. The graphite cannot exhibit its inherent sliding property, since the Cu or Cu-Sn matrix flows and then covers the graphite during the sliding. In this case, the wear resistance and seizure resistance are deteriorated.

Since the Pb content of the sliding material proposed in Japanese Examined Patent Publication No. 57-50844 is from 10 to 40% the compatibility is improved. However, the effect of the hard matter is not thoroughly exhibited because a portion of the hard matter included in the Pb matrix is removed from the matrix during sliding. In addition, since the Pb content is from 10 to 40%, preferential corrosion of Pb is likely to occur when the temperature of the lubricating oil is high, for example, from 120° to 130° C. Such corrosion occurred when the above-mentioned sliding material was used in an automatic transmission.

SUMMARY OF INVENTION

It is an object of the present invention to provide a sintered sliding material consisting of bronze with a hard additive, which exhibits improved wear-resistance when used as a sliding material in a condition where there is a possibility of wear due to the rough surface of the opposed material.

It is another object of the present invention to provide a sintered sliding material consisting of bronze with a hard additive, which exhibits improved property when used as a sliding material in a condition where there is a possibility of corrosion due to the lubricating oil.

It is a further object of the present invention to provide a bronze with a hard additive, which exhibits improved wear-resistance and corrosion-resistance when used as a sliding material in a condition where there is a possibility of wearing out due to the rough surface of the opposed material and of simultaneous corrosion due to the lubricating oil.

In accordance with the objects of the present invention, there are provided the following sliding materials.

(A) A sintered sliding material, which consists of from 1 to 10% by weight of at least one element selected from the group consisting of graphite, $MoS_2$ and $WS_2$, from 1 to 30% by weight of at least one hard matter selected from the group consisting of (a) and (b) given below, and from 0.1 to 15% by weight of Sn, the balance being essentially Cu.

(a) $Fe_2P$, $Fe_3P$, FeB, $Fe_2B$, Mo, Co, Co-based self-fluxing alloy, and Ni-based self-fluxing alloy (hereinafter referred to as "group (a)"), and, (b) Fe-Cr, Fe-Mn, Fe-Ni, Fe-Si, Fe-W, Fe-Mo, Fe-V, Fe-Ti, Fe-Nb, CuP, Cr, and W (hereinafter referred to as "group (b)")

(B) A sintered sliding material, which consists of from 1 to 10% by weight of at least one element selected from the group consisting of graphite, $MoS_2$ and $WS_2$, from 1 to 30% by weight of at least one hard matter selected from the groups (a) and (b), 0.1 to 15% by weight of Sn, and from 0.1 to 30% by weight of Pb, the balance being essentially Cu.

(C) A sintered sliding material, which consists of from 1 to 10% by weight of at least one element selected from the group consisting of graphite, $MoS_2$ and $WS_2$, from 0.1 to 10% by weight of at least one element selected from the group consisting of Si, Mn and Zn, from 1 to 30% by weight of at least one hard matter selected from the groups (a) and (b), and from 0.1 to 15% by weight of Sn, the balance being essentially Cu.

(D) A sintered sliding material, which consists of from 1 to 10% by weight of at least one element selected from the group consisting of graphite, $MoS_2$ and $WS_2$, from 0.1 to 10% by weight of at least one element selected from the group consisting of Si, Mn and Zn, from 1 to 30% by weight of at least one hard matter selected from the groups (a) and (b), from 0.1 to 15% by weight of Sn, and from 0.1 to 30% by weight of Pb, the balance being essentially Cu.

(E) A sintered sliding material, which consists of from 1 to 10% by weight of at least one element selected from the group consisting of graphite, $MoS_2$ and $WS_2$, from 0.1 to 10% by weight of Si, from 0.1 to 30% by weight of of at least one element selected from the group consisting of Mn and Zn, from 1 to 30% by weight of at least one hard matter selected from the groups (a) and (b), and from 0.1 to 15% by weight of Sn, the balance being essentially Cu.

(F) A sintered sliding material, which consists of from 1 to 10% by weight of at least one element selected from the group consisting of graphite, $MoS_2$ and $WS_2$, from 0.1 to 30% by weight of Si, from 0.1 to 30% by weight of at least one element selected from the group consisting of Mn and Zn, from 1 to 30% by weight of at least one hard matter selected from the groups (a) and (b), from 0.1 to 15% by weight of Sn, and from 0.1 to 30% by weight of Pb, the balance being essentially Cu.

The present invention is hereinafter described in detail.

The sliding materials (A), (C) and (E) are binary Cu-Sn alloy free of Pb. Pb is not contained so as to prevent its preferential corrosion. Heretofore, Pb was added in the Cu-based bearing alloy so as to enhance compatibility and the lubricating property. When the conventional bearing alloy is used in a condition where corrosion due to the lubricating oil is likely to occur, corrosion of Pb occurs first and then the hard matter and metal phases are removed from the material during sliding. The strength of the bearing decreases drastically and the life of the bearing thus expires. Contrary to this, the sliding materials (A), (C) and (E) according to the present invention exhibit improved corrosion-resistance because of the absence of Pb. The hard matter is added to these alloys so as to enhance wear-resistance. The wear-resistance of the sliding materials (A), (C) and (E) is considerably improved due to the addition of hard matter and the absence of Pb.

Sn added to the sliding materials (A) through (F) in an amount of 0.1% by weight or more improves the mechanical strength and corrosion resistance. When the Sn content exceeds 15%, Cu-Sn intermetallic compounds, which are very brittle, are precipitated in the Cu matrix, thereby impairing the resistance of the Cu matrix against load and impact. The preferred Sn content by weight is from 3 to 10%.

One or more kinds of hard matter, such as $Fe_3P$, Mo, Co, FeB, $Fe_2B$ and the like, are added to the bronze matrix metallic Cu powder and/or Sn powder in an amount of from 1 to 30% by weight. The hard matter and the bronze powder or Cu and Sn powder are mixed and sintered. The hard matter then disperses around or in the Cu-rich particles of the sintered material. When the sliding materials are brought into sliding contact with the opposed material, the hard matter is brought into contact with the opposed material and prevents the wear of the sliding material.

The hard matter belonging to group (a) are phosphides and a self-fluxing alloy which has properties equivalent to the phosphides. This hard matter damages the opposed material very slightly.

The hard matter belonging to group (b) are ferro-alloys as well as compounds and non-ferrous metals which have properties equivalent to the ferro-alloys.

When the content of the hard matter is less than 1%, it is not effective for enhancing the wear-resistance. On the other hand, when the content of the hard matter is more than 30%, a disadvantage of the hard matter, that is, damage to the opposed material and impairment of sintering property, becomes appreciable. The preferred content of the hard matter is from 2 to 10%, and the optimal content is from 3 to 6%.

Graphite, $MoS_2$ and $WS_2$ are additives which lower the coefficient of friction and exhibit lubricating property. These additives are dispersed between the Cu alloy particles, in which the hard matter is dispersed. The hard matter should not be dispersed in the particles of graphite and the like. The dispersion amount of the former in the latter should be as small as possible, if such dispersion occurs, since the former is liable to be removed from the latter due to its low holding force. When the amount of the graphite and the like is less than 1%, seizure resistance under the boundary lubricating condition is low. On the other hand, when the amount of the graphite and the like is more than 10%, the proportion of contacts between the Cu-alloy particles becomes small, and, hence, these particles are surrounded by the particles of graphite and the like. In this case, the strength and wear-resistance of the sliding materials decrease.

In the sliding materials (B), (D) and (F), from 0.1 to 30% of Pb is added so as to improve compatibility and the lubricating property over the sliding materials (A), (C) and (E).

Corrosion-resistance is, however, slightly sacrificed in the sliding materials (A), (C) and (E). When the Pb content is less than 0.1%, the compatibility is not improved. On the other hand, when the Pb content is 30% or more, the corrosion-resistance is seriously impaired. The preferred Pb content is from 3 to 9%.

One or more of Si, Mn and Zn, which are added in an amount of from 0.1 to 10% by weight to the bronze matrix of the sliding materials (B) and (C), enhance the holding force of the matrix for holding the graphite and the like. Every one of these elements has a good compatibility with Cu, and the solid-solution strengthens Cu. In addition, Si in an amount exceeding the solubility limit, precipitates as intermetallic compounds and precipitation-strengthens. The hardness and strength of the Cu matrix are therefore enhanced by these elements, with the result that the graphite and the like are strongly held by the Cu-alloy particles. Therefore, the graphite and the like are removed a little from the Cu matrix and are slightly broken into pieces during sliding. In addition, the flow of the Cu matrix during sliding occurs with difficulty. The graphite and the like can therefore exhibit their inherent properties. Si, Mn and Zn are preliminarily alloyed with Cu and then mixed with the other starting powder materials. Alternatively, Si, Mn and Zn in the elemental form may be mixed with the other starting powder material and then be reacted with Cu during sintering.

In the sliding materials (C) and (D), from 0.1 to 10% by weight of one or more of Si, Mn and Zn are added.

In the sliding materials (E) and (F), from 0.1 to 10% by weight of Si and from 0.1 to 30% by weight of one or more of Mn and Zn are added.

The above described sliding materials are produced by mixing a metallic powder, such as Cu, Sn and Pb powder, and an alloy powder (grain size under 177 μm) with the powder of the hard matter (grain size under 100 μm), by means of a V blender.

The mixture is pre-sintered, and the pre-sintered compact is crushed. The obtained powder is mixed with graphite (grain size under 100 μm).

The powder mixture is dispersed on a steel sheet backing, and sintered together with the steel sheet backing at a temperature of from 650° to 900° C. The sintered compact may be pressed by rolls to create a denser structure.

BRIEF DESCRIPTION OF DRAWING

FIG. 1 is a graph showing the seizure resistance of the sliding material (E).

DESCRIPTION OF PREFERRED EMBODIMENTS

Since the hard particles are harder than the opposed material which is ordinarily used, they are wear-resistant to the opposed materials. This contributes to maintaining the sliding characteristics of the sliding material when the roughness of the opposed material is great, such as in the case where the opposed material is a nodular graphite cast iron (also referred to as ductile cast iron) or grey cast iron. The hardness of the as-cast nodular graphite cast iron is approximately Hv 200. The hardness of the heat-treated nodular graphite cast iron is approximately Hv 400. The hard matter has higher hardness values than the nodular graphite cast irons. The flaky or nodular graphite is removed from the sliding surface of the above cast irons during sliding with any kind of sliding materials, thereby forming protrusions on the sliding surface of the cast irons. The protrusions seriously damage and roughen the surface of a sliding material if it does not include any hard particles. The hard particles are resistant to the roughening of the surface, wear, and seizure load. The hard matter selected is firmly held in the Cu alloy.

Hereafter the corrosion-resistance is described. When the sliding material is exposed to lubricating oil, the Pb particles are corroded on the surface of the sliding material. As corrosion further proceeds, the corrosion of Pb particles occurs not only on the surface but also in the interior of the sliding material. The Pb particles therefore dissolve away from the sliding material. In such a situation, the strength of the sliding material is greatly lessened due to a decrease in the density thereof. In addition, the lubricating property of the sliding material is lost. Furthermore, the hard particles cannot be resistant against damage by the rough surface of the opposed material. This is related to the low strength of the sliding material. Specifically, since the aggregates of Cu particles are greatly deformed under the load of the opposed material, the hard particles are displaced away from the opposed material. As a result, the life of the sliding material is lost. The corrosion due to lubricating oil is more likely to be chemical than electro-chemical; that is, the electro-chemical corrosion is due to the difference in the potential between the noble Cu and the less noble Pb. The corrosive media seem to be (1) inorganic acid formed by the combustion gas of the engine oil which intrudes into the lubricating oil, (2) organic acid contained in the lubricating oil, and (3) an additive(s) to the lubricating oil. The objective and the conditions of use of an appliance decide which kind of corrosive media causes the corrosion of Pb particles. For example, in the case of a sliding bearing used in an automatic transmission, (2) is the most probable corrosive medium. In the case of an engine operated in severe conditions, (1) is the most probable corrosive medium.

The present inventors tried to enhance the corrosion-resistance of the Pb particles by means of alloying them. However, all of the alloying elements tested were alloyed with the Cu particles. The present inventors therefore conceived of an alternative to the alloying method: that is, the amount of the Pb particles is decreased by means of decreasing the Pb content, or no Pb is included. The life of a sliding bearing could thus be prolonged when used in a corrosive condition.

The sliding materials according to the present invention can be used for a bush which is in sliding contact with the rotary shaft of an oil pump. Since the sliding condition of such a bush is fluid lubrication, the main cause of the shortened life of the bush is corrosion.

The sliding materials according to the present invention can be used for a bush which is in slidable contact with a sun gear. In this case, the main cause of the shortened life of the bush is wear.

The present invention is hereinafter described by way of an example.

1. Bronze having a composition of Cu—10% Sn was pulverized by an atomizing method. The resulting powder, under 177 μm grain size, was used as the starting material. $Fe_3P$ powder was prepared in the form of a powder under 63 μm grain size to be used as the hard matter. The bronze powder was mixed with 5% of the $Fe_3P$ powder by a V blender for about 30 minutes. This powder mixture was loaded in a graphite mold 10 cm in diameter and 10 cm in height and then compacted at a pressure of 1 ton/cm². The compact was pre-sintered at 450° C. for 30 minutes in $H_2$ gas atmosphere. The pre-sintered compact was crushed to a size under 100 mesh by a crushing machine. To this powder, 6% of the graphite particles (average diameter —20 μm) was mixed.

The powder mixture was sprayed to a thickness of 1 mm on a 1.36 mm thick steel sheet which was preliminarily degreased and sanded. The sintering was then carried out at a temperature of 820° C. for 30 minutes in $H_2$ atmosphere. After rolling, the second sintering was carried out under indentical conditions. Bimetal materials were therefore obtained and were cut to a predetermined size to provide test pieces for the wear test and seizure test.

1. Wear Test
Tester: a cylindrical flat plate-type friction and wear tester
Load: 10 kgf
Kind of Lubricating oil: automatic transmission fluid
Temperature of lubricating oil: 100° C.
Opposed shaft: S55C (quenched)
Rotation of shaft: 200 rmp Roughness of shaft: 1.5-2 μm Rz
Test time: 60 minutes
2. Seizure Test
Tester: a box-type bush tester
Rotation: 4800 rpm
Load: 150 kgf
Kind of lubricating oil: automatic transmission fluid
Lubricating method: dipping method
Temperature of lubricating oil: 20° C.
Opposed shaft: SCM420
Roughness of shaft: 0.8 μm Rz
Oil clearance: 50 μm After the initiation of the test, when the temperature of the bearings became stable, the oil was withdrawn from the tester. The temperature of the lubricating oil was then raised. The seizure resistance of the bearings was measured by the time of temperature elevation up to 200° C.

The following comparative materials were also tested.

(1) Comparative Material 1 JIS-LBC3(Cu-10% Pb-10% Sn, lead bronze)
(2) Comparative Material 2 JIS-LBC6(Cu-23% Pb-3% Sn, lead bronze)
(3) Comparative Material 3 LBC6 with additive of 5% $Fe_3P$

TABLE 1

|  | Seizure Resistance (h) | Wear Resistance (μm) |
|---|---|---|
| Inventive | 10 | 3 |
| Comparative Material 1 | 1.43 | 30 |
| Comparative Material 2 | 3 | 35 |
| Comparative Material 3 | 4 | 15 |

As is apparent from Table 1, the inventive material has superior seizure resistance and wear resistance to those of the comparative materials. As is also apparent from the comparison with the inventive material and Comparative Material 3, the addition of graphite improves the seizure resistance and wear resistance.

EXAMPLE 2

The composition of the mixed powder, i.e., the contents of Sn, Pb and hard matter, were changed as given in Table 2. The bimetal materials were produced by the method as described in Example 1, using the thus prepared mixed powder.

The conditions for the wear-resistance test were as follows.

1. Wear Test
Tester: a cylindrical flat plate-type friction and wear tester
Sliding Speed: 0.42 m/s
Load: 10 kgf
Kind of Lubricating oil: automatic transmission fluid
Temperature of lubricating oil: 120° C.
Opposed shaft: S55C (quenched)
Roughness of shaft: 1.5-2 μm Rz
Test time: 60 minutes The wear-resistance was measured by the wear volume of the tested materials.

Seizure test was carried out under the following conditions.

2. Seizure Test
Tester: a thrust tester
Rotation: 1000 rpm
Load: increased by 20 kgf per 10 minutes
Kind of lubricating oil: automatic transmission fluid
Lubricating method: dipping method
Temperature of lubricating oil: 50° C.
Opposed shaft: S55C
Roughness of shaft: 3 μm Rz
Measured unit of load: 10 kgf The seizure resistance was evaluated by the load at which the seizure occurred.

The corrosion-resistance test was carried out under the following conditions.

3. Corrosion Test
Tester: static oil-boiling tester
Kind of lubricating oil: automatic transmission fluid
Temperature of lubricating oil: 170±5° C.
Time: 200 hr The test results are shown in Tables 2 and 3.

TABLE 2-1

| Samples | Cu | Sn | Pb | Graphite | $MoS_2$ | $WS_2$ | $Fe_2P$ | $Fe_3P$ | CuP | FeB | $Fe_2B$ | Co | Ni based Self-Fluxing Alloy | Co based Self-Fluxing Alloy |
|---|---|---|---|---|---|---|---|---|---|---|---|---|---|---|
| Inventive A |
| 1 | Bal | 0.1 | — | 6 | — | — | — | 5.0 | — | — | — | — | — | — |
| 2 | Bal | 2.6 | — | 0.1 | — | — | — | — | — | — | 3.2 | — | — | — |
| 3 | Bal | 4.2 | — | — | 2.8 | — | — | 8.5 | — | — | — | — | — | — |
| 4 | Bal | 6.3 | — | 1.8 | — | — | 2.0 | — | 2.0 | — | — | — | 2.0 | — |
| 5 | Bal | 8.1 | — | 5 | — | — | — | 10.0 | — | 0.5 | — | — | — | — |
| 6 | Bal | 10.0 | — | — | 4.1 | 0.5 | 0.5 | 0.5 | — | 0.5 | 0.5 | — | — | 0.5 |
| 7 | Bal | 10.0 | — | 4 | — | — | — | 5.0 | — | — | — | — | — | — |
| 8 | Bal | 10.0 | — | — | 10 | — | — | — | — | 1.0 | — | 1.0 | — | 1.0 |
| 9 | Bal | 12.5 | — | — | — | 7.3 | — | 1.0 | — | — | — | — | — | — |
| 10 | Bal | 15.0 | — | — | 0.1 | — | — | 2.5 | 2.5 | — | — | — | — | — |
| Inventive B |
| 11 | Bal | 0.1 | 2.0 | — | 1.1 | — | — | — | — | — | — | — | — | — |
| 12 | Bal | 1.5 | 7.4 | 0.2 | — | — | 1.0 | — | — | — | 1.0 | — | — | 1.0 |
| 13 | Bal | 4.6 | 3.5 | — | 4 | — | — | 0.1 | — | — | — | — | — | — |
| 14 | Bal | 7.1 | 6.5 | 4 | — | — | — | 1.0 | — | — | — | 1.0 | — | — |
| 15 | Bal | 8.4 | 0.1 | — | — | 3 | — | 3.0 | 3.0 | — | — | — | — | — |
| 16 | Bal | 10.0 | 5.0 | 10 | — | — | — | — | — | 2.5 | — | 2.5 | 2.5 | — |
| 17 | Bal | 10.0 | 5.0 | — | 0.3 | — | 0.5 | 0.5 | 0.5 | 0.5 | 0.5 | 0.5 | — | 0.5 |
| 18 | Bal | 10.0 | 9.9 | 4 | — | — | — | 5.0 | — | — | — | — | — | — |
| 19 | Bal | 13.4 | 1.0 | — | — | 10 | — | — | 3.0 | — | — | — | — | — |
| 20 | Bal | 15.0 | 5.0 | 2 | — | — | — | 10.0 | — | — | — | — | — | — |
| Comparative |
| 21 | Bal | 10.0 | 15.0 | — | 5 | — | 5 | — | — | — | — | — | — | — |
| 22 | Bal | 10.0 | 20.0 | — | 5 | — | 5 | — | — | — | — | — | — | — |

TABLE 2-1-continued

| Samples | Cu | Sn | Pb | Graphite | MoS$_2$ | WS$_2$ | Fe$_2$P | Fe$_3$P | CuP | FeB | Fe$_2$B | Co | Ni based Self-Fluxing Alloy | Co based Self-Fluxing Alloy |
|---|---|---|---|---|---|---|---|---|---|---|---|---|---|---|
| 23 | Bal | 10.0 | 25.0 | — | 5 | — | 5 | — | — | — | — | — | — | — |
| 24 | Bal | 10.0 | 30.0 | — | 5 | — | 5 | — | — | — | — | — | — | — |
| 25 | Bal | — | 25.0 | — | — | — | — | — | — | — | — | — | — | — |
| 26 | Bal | — | 25.0 | — | — | — | — | 5.0 | — | — | — | — | — | — |
| 27 | Bal | 5.0 | 10.0 | — | — | — | — | — | — | — | — | — | — | — |
| 28 | Bal | 5.0 | 25.0 | — | — | — | — | — | — | — | — | — | — | — |
| 29 | Bal | 5.0 | 25.0 | — | — | — | — | 5.0 | — | — | — | — | — | — |

TABLE 2-2

| Samples | Corrosion Weight-Loss (mg) | Wear in Volume (mm$^3$) | Seizure Load (Kgf) |
|---|---|---|---|
| Inventive A | | | |
| 1 | 10 | 0.22 | 140 |
| 2 | 4 | 0.27 | 130 |
| 3 | 3 | 0.31 | 130 |
| 4 | 2 | 0.18 | 140 |
| 5 | 2 | 0.07 | 120 |
| 6 | 1 | 0.12 | 180 |
| 7 | 1 | 0.10 | 180 |
| 8 | 1 | 0.38 | 150 |
| 9 | 0.5 | 0.38 | 130 |
| 10 | 0.5 | 0.14 | 120 |
| Inventive B | | | |
| 11 | 9 | 0.29 | 120 |
| 12 | 13 | 0.22 | 130 |
| 13 | 3 | 0.35 | 130 |
| 14 | 4 | 0.24 | 150 |
| 15 | 9 | 0.19 | 140 |
| 16 | 2 | 0.14 | 210 |
| 17 | 2 | 0.20 | 160 |
| 18 | 3 | 0.16 | 230 |
| 19 | 2 | 0.39 | 150 |
| 20 | 2 | 0.10 | 170 |
| Comparative | | | |
| 21 | 14 | 0.32 | 120 |
| 22 | 17 | 0.35 | 140 |
| 23 | 19 | 0.38 | 160 |
| 24 | 20 | 0.40 | 180 |
| 25 | 28 | 1.68 | 20 |
| 26 | 29 | 0.72 | 70 |
| 27 | 16 | 0.89 | 40 |
| 28 | 20 | 1.13 | 20 |
| 29 | 21 | 0.42 | 90 |

TABLE 3

| Samples | Cu | Sn | Pb | Graphite | Hard Materials | Wear in Volume (mm$^3$) | Seizure Load (Kgf) |
|---|---|---|---|---|---|---|---|
| 30 | Bal | 10.0 | 5.0 | 4 | 5.0 (Fe$_2$P) | 0.14 | 220 |
| 31 | Bal | 10.0 | 5.0 | 4 | 5.0 (Fe$_2$P) | 0.13 | 230 |
| 32 | Bal | 10.0 | 5.0 | 4 | 5.0 (CuP) | 0.35 | 150 |
| 33 | Bal | 10.0 | 5.0 | 4 | 5.0 (FeB) | 0.24 | 170 |
| 34 | Bal | 10.0 | 5.0 | 4 | 5.0 (Fe$_2$B) | 0.24 | 160 |
| 35 | Bal | 10.0 | 5.0 | 4 | 5.0 (Co) | 0.21 | 160 |
| 36 | Bal | 10.0 | 5.0 | 4 | 5.0 (Ni based Self-Fluxing Alloy) | 0.20 | 170 |
| 37 | Bal | 10.0 | 5.0 | 4 | 5.0 (Co based Self-Fluxing Alloy) | 0.19 | 180 |
| 38 | Bal | 10.0 | 5.0 | 4 | 5.0 (Fe—Cr) | 0.18 | 210 |
| 39 | Bal | 10.0 | 5.0 | 4 | 5.0 (Fe—Mn) | 0.19 | 220 |
| 40 | Bal | 10.0 | 5.0 | 4 | 5.0 (Fe—Si) | 0.18 | 210 |
| 41 | Bal | 10.0 | 5.0 | 4 | 5.0 (Fe—W) | 0.26 | 180 |
| 42 | Bal | 10.0 | 5.0 | 4 | 5.0 (Fe—Mo) | 0.21 | 160 |
| 43 | Bal | 10.0 | 5.0 | 4 | 5.0 (Fe—W) | 0.26 | 210 |
| 44 | Bal | 10.0 | 5.0 | 4 | 5.0 (Fe—Ti) | 0.24 | 210 |
| 45 | Bal | 10.0 | 5.0 | 4 | 5.0 (Fe—Nb) | 0.21 | 220 |
| 46 | Bal | 10.0 | 5.0 | 4 | 5.0 (Cu—Si) | 0.29 | 150 |

EXAMPLE 3

The process of Example 1 was repeated except for the following points. The atomized bronze powder consisted of Cu-10% Sn-3% Si. The temperature of the lubricating oil was 140° C. in the wear-resistance test. The rotation was 4000 rpm and the oil temperature was 140° C. in the seizure resistance test. In addition, the roughness of the shaft was 2-3 μm Rz in the seizure resistance test.

The following comparative materials were also tested.

(1) Comparative Material 1
  JIS-LBC3(Cu-10% Pb-10% Sn, lead bronze)
(2) Comparative Material 2
  JIS-LBC6(Cu-23% Pb-3% Sn, lead bronze)
(3) Comparative Material 3
  LBC6 with additive of 5% Fe$_3$P
(4) Comparative Material 4
  The inventive material in this Example free of Si

TABLE 4

| | Seizure Resistance (h) | Wear Resistance (μm) |
|---|---|---|
| Inventive | 8 | 6 |
| Comparative Material 1 | 0.5 | 20 |
| Comparative Material 2 | 1.5 | 15 |
| Comparative Material 3 | 2.5 | 9 |
| Comparative Material 4 | 1.25 | 12 |

As is apparent from Table 4, the inventive material has superior seizure resistance and wear resistance to those of the comparative materials. As is also apparent from the comparison with the inventive material and Comparative Material 3, the addition of graphite improves the seizure resistance and wear resistance. Further, it is also apparent from the comparison with the inventive material and Comparative Material 4, the addition of Si improves the seizure resistance and wear resistance.

EXAMPLE 4

The process of Example 2 was repeated with regard to the compositions given in Table 5, except for the following items. The wear-resistance test: sliding speed-0.6 m/s; oil-temperature—150° C.; and, roughness of shaft 2-3 μmRz. The wear-resistance test: rotation—1500 rpm; load-increase by 10 kgf per 10 minutes. The corrosion resistance test: oil-temperature—160° C.

The results of the test are given in Table 5.

As is apparent from Table 2, the inventive materials have corrosion-resistance and seizure-resistance superior to those of the comparative materials.

In Table 6 are shown the properties of the material, in which the Sn, Pb, Mn, Si and graphite contents are consistantly set, i.e., 10%, 5%, 3%, 3%, and 10%, respectively. Although the values of the seizure resistance of the inventive materials vary twice between the highest and lowest ones, the seizure resistance of the inventive materials is superior to that of the comparative materials.

TABLE 5-1

| Samples | Cu | Sn | Pb | Si | Mn | Zn | Graphite | MoS$_2$ | WS$_2$ | Fe$_2$P | Fe$_3$P | CuP | FeB | Fe$_2$B | Co | Ni based Self-Fluxing Alloy | Co based Self-Fluxing Alloy |
|---|---|---|---|---|---|---|---|---|---|---|---|---|---|---|---|---|---|
| Inventive C | | | | | | | | | | | | | | | | | |
| 51 | Bal | 0.1 | — | 3 | — | — | — | 1 | — | — | — | 10 | — | — | — | — | — |
| 52 | Bal | 0.9 | — | — | — | 0.3 | — | — | — | — | — | — | 2 | — | — | — | — |
| 53 | Bal | 3 | — | 10 | — | — | 2 | — | — | — | — | — | — | 3 | — | — | — |
| 54 | Bal | 3 | — | — | — | — | — | — | 10 | 3 | — | — | — | — | — | 0.5 | — |
| 55 | Bal | 5 | — | 5 | — | — | — | 3 | — | — | — | — | — | — | — | — | 3 |
| 56 | Bal | 5 | — | — | — | 7 | 0.1 | — | — | 7 | — | — | — | — | — | — | 8 |
| 57 | Bal | 10 | — | 2 | — | — | 5 | — | — | — | — | — | 5 | — | — | 5 | — |
| 58 | Bal | 10 | — | — | — | 3 | — | 5 | — | — | 5 | — | — | — | — | — | — |
| 59 | Bal | 10 | — | — | 10 | — | — | — | 3 | — | — | — | — | — | 2 | — | — |
| 60 | Bal | 10 | — | — | — | 2 | 2 | — | — | 2 | — | — | 1 | — | — | 3 | — |
| Inventive D | | | | | | | | | | | | | | | | | |
| 61 | Bal | 0.1 | 0.1 | — | 5 | — | — | 10 | — | 3 | — | — | — | — | — | — | 5 |
| 62 | Bal | 0.9 | 0.9 | — | — | 5 | — | — | 5 | — | — | 10 | — | — | — | — | — |
| 63 | Bal | 3 | 3 | 3 | — | — | 3 | — | — | — | — | — | — | — | — | 3 | — |
| 64 | Bal | 3 | 3 | — | 10 | — | — | 1 | — | — | — | — | — | 1 | — | — | — |
| 65 | Bal | 5 | 5 | — | — | — | — | — | — | 5 | — | — | 3 | — | — | — | — |
| 66 | Bal | 5 | 5 | — | — | 1 | — | — | 3 | — | — | 1 | — | — | 1 | — | 2 |
| 67 | Bal | 10 | 5 | 0.5 | — | — | 3 | — | — | — | — | — | — | — | — | 5 | — |
| 68 | Bal | 10 | 5 | — | — | — | — | — | 2 | 1 | — | 1 | 1 | — | — | — | — |
| 69 | Bal | 10 | 10 | — | 3 | — | 3 | — | — | — | 5 | — | — | — | — | — | — |
| 70 | Bal | 10 | 10 | 2 | — | — | — | 2 | — | — | 5 | — | — | — | — | — | — |
| 71 | Bal | 10 | 15 | 5 | — | — | 5 | — | — | 5 | — | — | — | — | — | — | — |
| 72 | Bal | 10 | 20 | 5 | — | — | 5 | — | — | 5 | — | — | — | — | — | — | — |
| 73 | Bal | 10 | 25 | 5 | — | — | 5 | — | — | 5 | — | — | — | — | — | — | — |
| 74 | Bal | 10 | 30 | 5 | — | — | 5 | — | — | 5 | — | — | — | — | — | — | — |
| Comparative | | | | | | | | | | | | | | | | | |
| 75 | Bal | 10 | — | — | — | — | — | — | — | — | — | — | — | — | — | — | — |
| 76 | Bal | 10 | 10 | — | — | — | — | — | — | — | — | — | — | — | — | — | — |
| 77 | Bal | — | 25 | — | — | — | — | — | — | — | — | — | — | — | — | — | — |
| 78 | Bal | 3 | 25 | — | — | — | — | — | — | — | — | — | — | — | — | — | — |
| 79 | Bal | 3 | 25 | — | — | — | 4 | — | — | — | 3 | — | — | — | — | — | — |

TABLE 6

| Samples | Cu | Sn | Pb | Si | Mn | Graphite | Hard Materials | Wear in Volume (mm$^3$) | Seizure Load (Kgf) |
|---|---|---|---|---|---|---|---|---|---|
| 80 | Bal | 10.0 | 5.0 | 3 | 3 | 5 | 5.0 (Fe$_2$P) | 15 | 110 |
| 81 | Bal | 10.0 | 5.0 | 3 | 3 | 5 | 5.0 (Fe$_3$P) | 13 | 120 |
| 82 | Bal | 10.0 | 5.0 | 3 | 3 | 5 | 5.0 (CuP) | 30 | 80 |
| 83 | Bal | 10.0 | 5.0 | 3 | 3 | 5 | 5.0 (FeB) | 25 | 90 |
| 84 | Bal | 10.0 | 5.0 | 3 | 3 | 5 | 5.0 (Fe$_2$B) | 22 | 90 |
| 85 | Bal | 10.0 | 5.0 | 3 | 3 | 5 | 5.0 (Co) | 23 | 90 |
| 86 | Bal | 10.0 | 5.0 | 3 | 3 | 5 | 5.0 (Ni based Self-Fluxing Alloy) | 20 | 100 |
| 87 | Bal | 10.0 | 5.0 | 3 | 3 | 5 | 5.0 (Co based Self-Fluxing Alloy) | 19 | 100 |
| 88 | Bal | 10.0 | 5.0 | 3 | 3 | 5 | 5.0 (Fe—Cr) | 21 | 110 |
| 89 | Bal | 10.0 | 5.0 | 3 | 3 | 5 | 5.0 (Fe—Mn) | 20 | 110 |
| 90 | Bal | 10.0 | 5.0 | 3 | 3 | 5 | 5.0 (Fe—Si) | 19 | 110 |
| 91 | Bal | 10.0 | 5.0 | 3 | 3 | 5 | 5.0 (Fe—W) | 23 | 100 |
| 92 | Bal | 10.0 | 5.0 | 3 | 3 | 5 | 5.0 (Fe—Mo) | 23 | 100 |
| 93 | Bal | 10.0 | 5.0 | 3 | 3 | 5 | 5.0 (Fe—V) | 25 | 100 |
| 94 | Bal | 10.0 | 5.0 | 3 | 3 | 5 | 5.0 (Fe—Ti) | 24 | 90 |
| 95 | Bal | 10.0 | 5.0 | 3 | 3 | 5 | 5.0 (Fe—Nb) | 26 | 90 |
| 96 | Bal | 10.0 | 5.0 | 3 | 3 | 5 | 5.0 (Cu—Si) | 28 | 80 |
| 97 | Bal | 10.0 | 5.0 | 3 | 3 | 5 | 5.0 (Fe—Ni) | 25 | 90 |

EXAMPLE 5

The process of Example 1 was repeated except for the following points. The atomized bronze powder consisted of Cu-10% Sn-2% Si-1% Mn-0.3% Fe. The temperature of the lubricating oil was 100° C. in the wear-resistance test. The seizure resistance test was carried out by the method used in Example 2 except that the load was increased by 10 kgf per 10 minutes and, further, the oil temperature was 80° C. In addition, the corrosion resistance test was also carried out by the method used in Example 2.

The results of the test are given in Table 7.

TABLE 7-1

| Samples | Cu | Sn | Pb | Si | Zn | Mn | Graphite | $MoS_2$ | $WS_2$ |
|---|---|---|---|---|---|---|---|---|---|
| Inventive E | | | | | | | | | |
| 101 | Bal | 0.1 | — | 5.0 | 15.0 | — | — | 5.3 | — |
| 102 | Bal | 2.6 | — | 10.0 | 0.2 | — | 7.7 | — | — |
| 103 | Bal | 4.2 | — | 8.0 | — | 30.0 | — | — | 1.8 |
| 104 | Bal | 6.3 | — | 1.5 | 22.0 | — | 2.0 | — | — |
| 105 | Bal | 8.1 | — | 0.1 | 30.0 | — | 0.1 | — | — |
| 106 | Bal | 10.0 | — | 4.5 | 3.0 | — | 0.5 | 3.3 | — |
| 107 | Bal | 10.0 | — | 2.5 | — | 5.0 | 2.9 | — | — |
| 108 | Bal | 10.0 | — | 7.2 | — | 0.5 | — | — | 3.9 |
| 109 | Bal | 12.5 | — | 3.3 | 6.0 | — | 5.5 | — | — |
| 110 | Bal | 15.0 | — | 6.5 | — | 11.0 | — | — | 10.0 |
| Inventive F | | | | | | | | | |
| 111 | Bal | 0.1 | 2.0 | 5.2 | — | 14.2 | — | 6.0 | — |
| 112 | Bal | 1.5 | 7.4 | 7.8 | 21.0 | — | 1.0 | — | — |
| 113 | Bal | 4.6 | 3.5 | 9.9 | 0.2 | — | 4.3 | 0.2 | — |
| 114 | Bal | 7.1 | 6.5 | 6.6 | — | 3.3 | — | — | 9.9 |
| 115 | Bal | 8.4 | 0.1 | 4.8 | 20.5 | — | — | 4.4 | — |
| 116 | Bal | 10.0 | 5.0 | 2.5 | 13.3 | — | 6.2 | — | — |
| 117 | Bal | 10.0 | 5.0 | 0.1 | — | 0.1 | 0.5 | 3.0 | — |
| 118 | Bal | 10.0 | 9.9 | 1.5 | 30.0 | — | — | 2.1 | — |
| 119 | Bal | 13.4 | 1.0 | 5.8 | 3.5 | — | — | 1.2 | 1.2 |
| 120 | Bal | 15.0 | 5.0 | 8.8 | — | 6.5 | 2.8 | — | — |
| Comparative | | | | | | | | | |
| 121 | Bal | — | 25.0 | — | — | — | — | — | — |
| 122 | Bal | — | 25.0 | — | — | — | 5.0 | — | — |
| 123 | Bal | 5.0 | 10.0 | — | — | — | — | — | — |
| 124 | Bal | 5.0 | 25.0 | — | — | — | — | 3.0 | — |
| 125 | Bal | 5.0 | 25.0 | — | — | — | — | — | — |

TABLE 7-2

| Samples | Corrosion Weight-Loss (mg) | Wear in Volume ($mm^3$) | Seizure Load (Kgf) |
|---|---|---|---|
| Inventive E | | | |
| 101 | 18 | 102 | 90 |
| 102 | 17 | 89 | 100 |
| 103 | 16 | 86 | 110 |
| 104 | 14 | 95 | 120 |
| 105 | 15 | 92 | 120 |
| 106 | 12 | 78 | 130 |
| 107 | 11 | 88 | 130 |
| 108 | 12 | 85 | 120 |
| 109 | 11 | 83 | 130 |
| 110 | 11 | 81 | 120 |
| Inventive F | | | |
| 111 | 22 | 110 | 100 |
| 112 | 18 | 96 | 110 |
| 113 | 15 | 91 | 100 |
| 114 | 17 | 83 | 120 |
| 115 | 11 | 79 | 110 |
| 116 | 19 | 76 | 140 |
| 117 | 19 | 80 | 120 |
| 118 | 22 | 85 | 120 |
| 119 | 15 | 79 | 120 |
| 120 | 16 | 81 | 110 |
| Comparative | | | |
| 121 | 33 | 135 | 80 |
| 122 | 31 | 130 | 90 |
| 123 | 25 | 122 | 70 |
| 124 | 25 | 126 | 90 |
| 125 | 27 | 148 | 80 |

As is described hereinabove, the materials according to the present invention exhibit improved properties when they are used under conditions such that; wear is likely to occur due to great roughness of the opposed shaft, corrosion due to the lubricating oil is likely to occur, or wear and corrosion are likely to proceed simultaneously.

We claim:

1. A sintered sliding material having a wear-resistance and corrosion-resistance to prevent intrusion of lubricating oil into the interior of said sliding materials, which consists of from 1 to 10% by weight of at least one element selected from the group consisting of graphite, $MoS_2$ and $WS_2$, from 1 to 30% by weight of at least one hard matter selected from the groups (a) and (b), and from 0.1 to 15% by weight of Sn, the balance being essentially Cu, wherein intrusion of lubricating oil into the interior of said sintered sliding material is prevented and wherein the groups (a) and (b) are defined as follows:

(a) $Fe_2P$, $Fe_3P$, FeB, $Fe_2B$, Mo, Co-based self fluxing alloy, and Ni-based self fluxing alloy, and (b) Fe-Cr, Fe-Mn, Fe-Ni, Fe-Si, Fe-W, Fe-Mo, Fe-V, Fe-Ti, Fe-Nb, CuP, Cr, and W.

2. A sintered sliding material according to claim 1, wherein the content of the hard matter is from 2 to 10% by weight.

3. A sintered sliding material according to claim 1, wherein the Sn content is from 3 to 10% by weight.

* * * * *